Sept. 30, 1958 C. S. NICHOLS 2,854,282
RETRACTIBLE WINDSHIELD VISOR
Filed Aug. 7, 1956 2 Sheets-Sheet 1

INVENTOR
Christabel S. Nichols
BY
Wooster & Davis
ATTORNEYS.

Sept. 30, 1958 C. S. NICHOLS 2,854,282
RETRACTIBLE WINDSHIELD VISOR
Filed Aug. 7, 1956 2 Sheets-Sheet 2

INVENTOR
Christabel S. Nichols
BY
Wooster & Davis
ATTORNEYS.

2,854,282
RETRACTIBLE WINDSHIELD VISOR
Christabel S. Nichols, Norwalk, Conn.
Application August 7, 1956, Serial No. 602,660
6 Claims. (Cl. 296—95)

This invention relates to a retractible windshield visor for motor cars, such as automobiles and the like, yachts, heavy industrial equipment such as excavating shovels, and other out-door equipment or vehicles for protecting the occupants from sun glare and the windshield from rain, and has for an object to provide a simple and improved visor construction and arrangement which will require a minimum of space under the top of the car and thus will not materially decrease the head room in the car.

Another object is to provide such a visor which will be self-supporting, and in its extended position will thus reduce to a minimum the number of parts visible at the front of the windshield and will materially simplify the construction involved.

Another object is to provide such a visor may be used as an anti-glare visor to prevent blinding of the driver by the sun or lights, and may also be used to cover the outside of the windshield when the car is parked to keep it clear of rain or snow.

Another object is to provide a visor which may be readily shifted between an extended position of use forwardly of and over the windshield and a retracted position within the car, and to provide an improved means for performing these shifting operations, which may be operated by a small electric motor in any suitable position in the car, such, for example, as in a position between this top and the finishing fabric of the car, and which may be controlled by any suitably positioned switch.

With the foregoing and other objects in view, I have devised the construction illustrated in the accompanying drawings forming a part of this specification. It is, however, to be understood the invention is not limited to the specific details of construction and arrangement shown, but may embody various changes and modifications within the scope of the invention.

Figure 1:
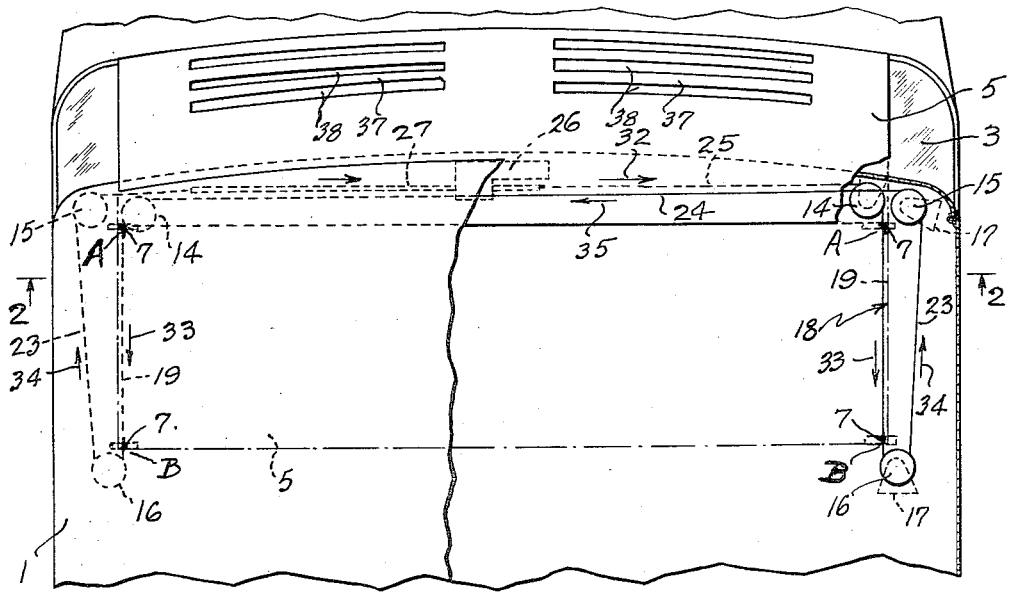
Fig. 1 is a top plan view of the front portion of the top of an automobile with this visor positioned therein, and with parts broken away to more clearly show the construction, the visor and the means for operating it being shown diagrammatically.

With the modern type of automobile the windshield is usually considerably inclined, often making it difficult for the usual windshield wiper to keep the windshield clean and clear in stormy weather, and particularly is this true in sleet and snow or icy conditions. It is an object of the present invention to provide a simple and easily shifted visor construction which may be positioned in the car immediately over the top of the windshield in the curved front portion of the top of the car, and one which may be shifted to a position extending forwardly over the top of the windshield to protect the windshield materially against deposit of rain or snow or the like on the windshield, and thus greatly relieving the work of the usual windshield wiper. It is also an object to provide a visor of this type which may act as a non-glare or sun visor, either inside or outside the car, and still further it may be so mounted that it may be shifted to a fully extended forward position and when in this position is adapted to swing downwardly over and cover the front of the windshield to protect it against deposit of rain, snow or ice while the car is parked, and thus assure a clean windshield when the operator again wishes to operate the car, and will also eliminate the necessity of first cleaning the windshield for this operation. An electric heating unit may be molded in the visor for freeing it of ice and snow before it is retracted into the car.

It is to be noted that in the drawings the thickness and spacing of different parts are exaggerated for illustration purposes, and that much less actual space is required in installation of the device as described than these drawings might indicate, for this reason.

Figure 2:
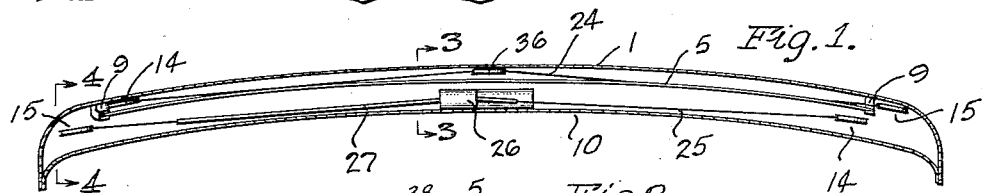
Fig. 2 is a transverse section thereof substantially on line 2—2 of Fig. 1.
Figure 5:
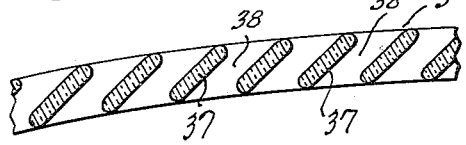
Fig. 5 is a detail section of a portion of a visor construction which may be used.
Figure 7:
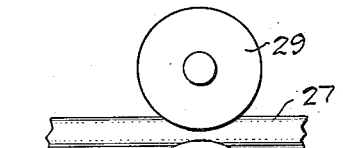
Fig. 7 is a somewhat diagrammatically shown portion of one type of drive mechanism which may be used with an electric motor for shifting the visor.
Figure 7:
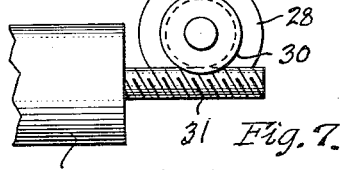
Figure 8:
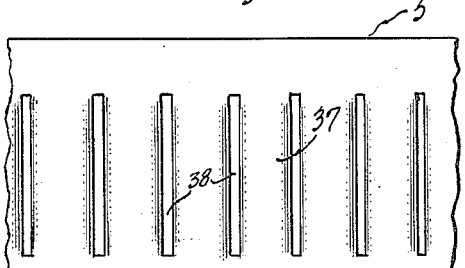
Fig. 8 is a view thereof looking from the right of Fig. 7.
Figure 8:
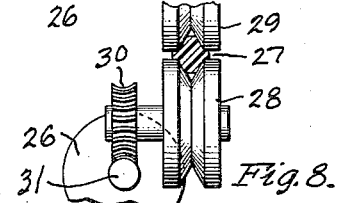
Figure 6:
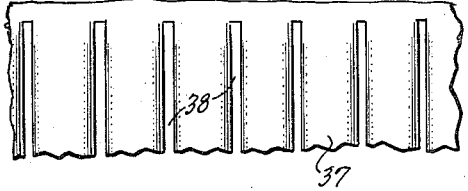
Fig. 6 is a plan view thereof.
Figure 3:
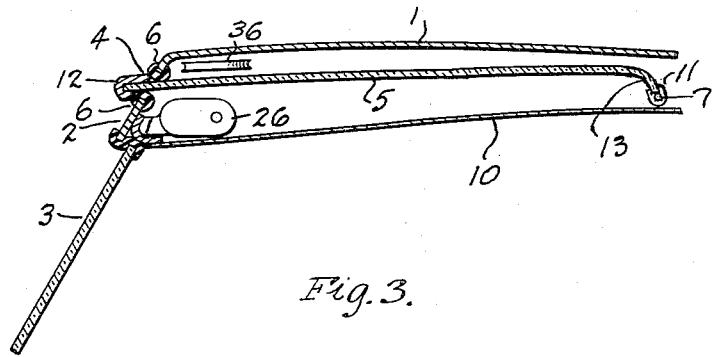
Fig. 3 is a detail section on a larger scale taken substantially on line 3—3 of Fig. 2.

The curved top of an automobile is indicated at 1, and is usually transversely curved, and includes a downwardly curved and inclined front portion 2 immediately over the top edge of the windshield 3. In this downwardly curved and inclined front portion 2 is a transversely extending slot 4, preferably transversely curved to substantially the same curvature as the top 1, and extending through this slot is a visor 5 constructed in one piece and formed of a thick, rigid sheet of molded Fiberglas or plastic transversely curved, as shown in Fig. 2, similarly to said top and the slot, the transverse curvature and thickness being such as to add sufficient strength and rigidity to the one-piece visor so that it is self-supporting when in an extended position forwardly of the slot, as indicated, for example, in dotted lines, at 5a in Fig. 4, against wind and other pressures incident to operation of the car. A thickness of three-eighths to one-half inch or even less has been found satisfactory. The visor may be clear and transparent or it could be tinted to different colors, or semi-transparent, or even opaque if desired. The upper and lower edges of the slot are each covered with a suitable gasket 6 of such material as, for example, resilient rubber or felt or other similar fiber, to prevent leakage of moisture into the car and also to provide supporting and guiding means for the visor on its movements between the extended and retracted positions, as well as prevent rattle. At its opposite ends and adjacent its rear edge the visor is supported and guided by laterally extending lugs 7 which may be in the shape of pins secured to the visor and projecting from its opposite ends near its rear edge and each running in a guide channel 8 in a guide member 9, mounted immediately below the top 1 and above the finishing fabric 10. These lugs could be mounted directly in the visor, but a simple and effective means is to enclose the rear edge in a metal channel member 11 and mount these lugs 7 in the opposite ends of this channel member. This channel member also strengthens and stiffens the visor and provides a supporting means for the full length of its rear edge, which is thus supported by the lugs 7 in the guide channels 9. The forward free edge of the visor may be enclosed in a chrome-plated channel member 12 if desired which will act as possibly improving the appearance of the visor and also as strengthening and stiffening means.

Figure 4:
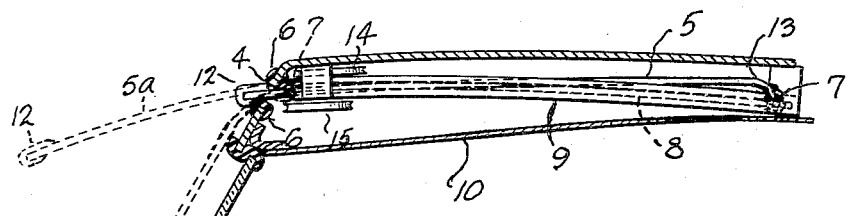
Fig. 4 is a similar section taken substantially on line 4—4 of Fig. 2 and indicating in dotted lines different extended positions of the visor.
Figures 9, 10:
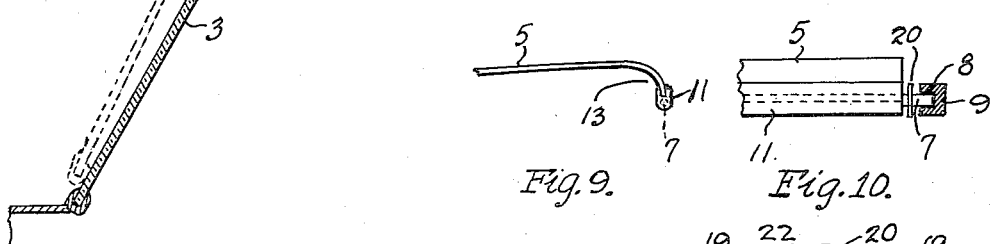
Fig. 9 is an edge view of the rear edge portion of the visor.
Fig. 10 is a view looking from the right of Fig. 9 and showing the guide and supporting means in a section.

The visor is so mounted that when in its fully extended position it may swing downwardly to substantially the position shown in dotted lines at 5b in Fig. 4 over the front of and covering the windshield 3 to protect the windshield against deposit of rain and snow or ice while the car is parked, and thus provide a clean windshield when it is desired to again use the car, and obviates the necessity for cleaning the windshield before using the car. For this purpose the lugs 7 running in the channel guides 9 act as a pivotal support for the visor adjacent its rear edge, and when the visor is in its fully extended position this pivotal support permits it to swing downwardly to the dotted line position of Fig. 4. Also to facilitate this action through the slot 4, the rear edge portion of the visor is curved downwardly as shown at 13, which permits the visor to assume the dotted line position of Fig. 4 over the front of the windshield with this curved portion extending through the slot 4. An electrical heating unit (not shown) may be molded in the Fiberglas or plastic visor for freeing it of ice or snow before shifting it to the retracted position.

Figure 11:
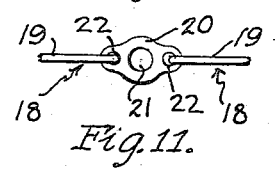
Fig. 11 is a side view of an effective type of connection which may be used to connect the operating parts to the visor.

A simple and effective means is provided to shift the visor in the slot between its extended and retracted positions, and also one which may employ a small electric motor for performing the shifting operations. A preferred means comprises a set of pulleys or wheels so arranged that a single motor will move the visor to any set position and maintain exact parallelism at all times and in all positions. Such a device and arrangement is shown diagrammatically in Figs. 1 and 2. In this arrangement there are provided at each end of the visor mounted by any suitable means immediately under the top 1, a set of three guide pulleys, each set comprising a pair of forward pulleys 14 and 15 and a rear pulley 16 mounted by any suitable means such, for example, as suitable brackets 17 indicated diagrammatically. Running over these pulleys is a suitable cord 18, preferably of nylon and having a run portion 19 at each end of the visor and secured thereto by any suitable means adjacent the rear edge of the visor. The lugs 7 are effective means by which this cord may be connected to the opposite ends of the visor, and a suitable means for doing this is shown in Fig. 11 comprising a plate 20 provided with an opening 21 through which the lugs 7 may extend, and this plate is provided with openings 22 in its opposite ends on opposite sides of the opening 21 to which the cord 18 may be connected, as indicated.

The pulleys and the cord are so arranged that the portion 19 secured to each end of the visor by the lug 7 forms a portion extending from one forward pulley 14 to one side of the rear pulley 16 in that set, and a portion 23 extends from the opposite side of the pulley 16 to the other front pulley 15 of that set. It then runs from that pulley to the other front pulley 14 of the other set at the opposite end of the visor, forming two longitudinally extending portions 24 and 25. The operating motor, preferably a small electric motor 26, is shown connected to one of these longitudinal portions, in the arrangement shown to the portion 25, and it may be connected thereto for shifting the cord by any suitable means. In the arrangement shown the cord includes a thickened portion 27 of nylon, as, for example, a nylon reed, to the opposite ends of which the nylon cord is connected, and this thickened portion is arranged to run between a pair of grooved friction pulleys 28 and 29 one of which is connected to a worm gear 30 and operated by a worm drive 31 driven by the motor, which will thus shift the thickened portion 27 and the portion 25 of the cord to which it is connected in opposite directions to shift the visor between its extended and retracted positions.

Thus in Fig. 1 the visor is shown in full lines in a forwardly extended position and in broken lines diagrammatically in its retracted position. In shifting from the forward to the retracted position the connection 7 connecting the visor to the nylon cord at each end of the visor is shifted from its forward position A to its rear position B. To effect this operation the direction of movement of the various portions of the cord between the respective pulleys is indicated by the arrows. Thus as the portion 25 is shifted to the right, as indicated by the arrow 32, the two portions 19 running between the pulleys 14 and 16 and which are connected to the opposite ends of the visor, will move inwardly or downwardly as indicated by the arrows 33. Therefore the portions 23 of the cord running between the pulleys 16 and 15 will move forwardly as indicated by the arrows 34, and the other longitudinal section 24 running between the right hand pulley 15 and the left hand pulley 14 will move to the left as indicated by the arrow 35. Thus the two portions 19 of the cord running between the pulleys 15 and 16 and which are connected to the opposite ends of the visor will run simultaneously in the same direction and the same amounts, to thus shift the visor from its extended to its retracted position. On operation of the motor in the opposite direction, the thickened nylon portion 27 and the longitudinal portion 25 of the cord will be shifted in the opposite direction, thus shifting the portions 19 forwardly and by their connections 7 to the visor shifting the visor forwardly. Thus broadly speaking, the cord and pulleys are arranged to provide a forwardly and rearwardly extending portion of the cord at each end of the visor and connected thereto adjacent its rear edge, and which cord also includes a longitudinal portion extending between pulleys at opposite ends of the visor and so connected to the first portions as to shift both of them in the same direction at the same time, either forwardly or backwardly, on operation of this longitudinal portion in either direction by the motor.

Furthermore, the type of connection 20 between the cord and the lugs 7 on the opposite ends of the visor acts as a pivotal connection between the cord and the lugs 7, so that when the visor is extended to its fully forward position it may readily swing downwardly about these lugs as a pivot to its dotted line position 5b over the front of the windshield.

The motor 26 may be located in any suitable position such, for example, as adjacent the front of the top immediately under and between this top and the fabric finish 10, or it could be located immediately over the rear view mirror, or any other suitable location. It will be controlled by any suitable switch means (not shown) and located in any desired position, such, for example, as the dash or instrument board, and any suitable type of adjusting or tensioning means (also not shown) may be provided for maintaining proper tension and alignment of the operating cord. Also any other guide pulley or suitable guide means may be provided for the cord found desirable for any portion thereof such, for example, as the pulley 36 for guiding the longitudinal portion 24 of the cord above the visor.

Still further, a portion of the visor may be formed of a slotted or louvered construction, as indicated by the slats or louvers 37 separated by slots 38 through the visor, to permit passage of air to reduce wind pressures on the visor during storms or while driving at relatively high speeds. The louvers may be either stationary and integral with the visor structure, or pivoted so as to be normally closed and blown open by wind pressure.

It will be seen from the above that this provides a very simple and effective visor construction and arrangement, together with simple and effective means for easily and quickly shifting it to a retracted position to prevent glare and to protect the windshield when desired, and as easily retract it into the car when its use is not desired, and which construction and operating device occupy a minimum of space and can be readily located between the top of the car and the fabric finish at the under side of this top within the car, and not materially reduce the head room, and the visor may be readily and quickly shifted between desired extended and retracted positions by simple manipulation of an electric switch, and it will be automatically retained in these positions. The same type of visor may be installed at the rear of the car to be used when the car is parked to keep the rear window free of ice and snow, and also provide protection from sun for the rear seat passengers without interfering with the rear view for the driver as a shade would do.

When there is not outside visor this same mechanism may be used in conjunction with a semi-transparent plastic visor to operate within the car as a sun visor, thereby replacing the present manually operated visors. "Calobar" is suggested for color of visor.

Having thus set forth the nature of my invention, I claim:

1. In a car including a windshield, a transversely curved top over said windshield provided with a similarly curved slot in its front wall just over said windshield, a one-piece visor formed of a thick, rigid sheet of molded plastic transversely curved similarly to said top and slot, said transverse curvature and thickness being such as to add sufficient strength and rigidity to the one-piece visor so that it is self-supporting when in extended position forwardly of the slot against wind and other pressures incident to operation of the car, grooved guides under said top at opposite ends of the visor, guide lugs on the visor adjacent its rear edge running in said guides and forming a support in the guides for the rear edge of the visor in both the extended and retracted positions and permitting the visor to swing downwardly to a position over the windshield when in its extended position, a set of three pulleys mounted adjacent each end of the visor under the top arranged with first and second pulleys of each set adjacent the front edge and a third adjacent the rear edge of the visor when it is in its retracted position, a cord runing from the first of each of the pair of front pulleys rearwardly to one side of the rear pulley of that set adjacent each end of the visor and connected to the visor adjacent its rear edge, said cord running from the other side of each rear pulley forwardly to the second front pulley of its set and from that pulley across to the first front pulley of the other set, and an operative motor connected to one of the cross cord portions running between two front pulleys for shifting it longitudinally to shift the visor between its extended and retracted positions.

2. In a car including a windshield, a transversely curved top over said windshield provided with a similarly curved slot in its front wall just over said windshield, a one-piece visor formed of a thick, rigid sheet of molded plastic transversely curved similarly to said top and slot, said transverse curvature and thickness being such as to add sufficient strength and rigidity to the one-piece visor so that it is self-supporting when in extended position forwardly of the slot against wind and other pressures incident to operation of the car, the rear edge portion of the visor being also curved downwardly, grooved guides under said top at opposite ends of the visor, guide lugs at the opposite ends of the visor adjacent its rear edge running in said guides and forming a support for the visor in said guides in both the extended and retracted positions, said grooved guides being of a length and positioned to permit shifting of the visor to a fully extended position with its rear edge closely adjacent the rear of the slot, said lugs also forming a pivotal support for the rear edge of the visor when in this fully extended position to permit the visor to swing downwardly to lie over and cover the front side of the windshield, and means to shift the visor between the extended and retracted positions.

3. The combination of claim 2 in which the operative means for shifting the visor between its extended and retracted positions comprises a set of three pulleys mounted adjacent each end of the visor under the top arranged with first and second pulleys of each set adjacent the front edge and a third adjacent the rear edge of the visor when it is in its retracted position, a cord running from the first of each of the pair of front pulleys rearwardly to one side of the rear pulley of that set adjacent each end of the visor and connected to the visor adjacent its rear edge, said cord running from the other side of each rear pulley forwardly to the second front pulley of its set and from that pulley across to the first front pulley of the other set, and an operative motor connected to one of the cross cord portions running between two front pulleys for shifting it longitudinally to shift the visor between its extended and retracted positions.

4. In a car including a windshield, a transversely curved top over said windshield provided with a similarly curved slot in its front wall just over said windshield, a one-piece visor formed of a thick, rigid sheet of molded plastic transversely curved similarly to said top and slot, said transverse curvature and thickness being such as to add sufficient strength and rigidity to the one-piece visor so that it is self-supporting when in extended position forwardly of the slot against wind and other pressures incident to operation of the car, the rear edge portion of the visor being curved downwardly, guide and supporting means for the opposite ends of the visor comprising grooved guides, a transverse channel member in which the rear edge of the visor is seated, and pivot lugs mounted in said channel member and extending into said grooves in the guides, and means for shifting the visor in the slot between an extended position projecting forwardly therefrom and a retracted position, comprising a set of three pulleys mounted adjacent each end of the visor under the top arranged with first and second pulleys of each set adjacent the front edge and a third adjacent the rear edge of the visor when it is in its retracted position, a cord running rearwardly from the first of each of the pair of front pulleys to one side of the rear pulley of that set adjacent each end of the visor and connected to the visor adjacent its rear edge, said cord running from the other side of each rear pulley forwardly to the second front pulley of its set and from that pulley across to the first front pulley of the other set, an operative motor connected to one of the cross cord portions running between two front pulleys for shifting it longitudinally to shift the visor between its extended and retracted positions, and said lugs providing pivotal supports for the visor when in its forward position permitting it to swing downwardly to a position over and in front of the windshield.

5. The combination of claim 4 in which a portion of the visor comprises a slotted and slat construction to permit air to flow through the visor and reduce the wind pressures on the visor due to storms or driving the car at relatively high speeds.

6. The combination of claim 2 in which there is a channel member in which the rear edge of the visor is seated and the guide lugs are mounted in this channel member and project therefrom into the grooves of the guides.

References Cited in the file of this patent

UNITED STATES PATENTS

| | | |
|---|---|---|
| 1,590,473 | Miller | June 29, 1926 |
| 1,735,177 | Pearce | Nov. 12, 1929 |
| 2,102,454 | Bennett | Dec. 14, 1937 |
| 2,326,357 | Horton | Aug. 10, 1943 |
| 2,399,940 | Piron | May 7, 1946 |
| 2,528,903 | Nichols | Nov. 7, 1950 |
| 2,697,004 | Hovis | Dec. 14, 1954 |

FOREIGN PATENTS

| | | |
|---|---|---|
| 644,031 | France | May 26, 1928 |